Oct. 14, 1930.  H. P. PETZNICK  1,778,468
SICKLE BAR
Filed April 4, 1929
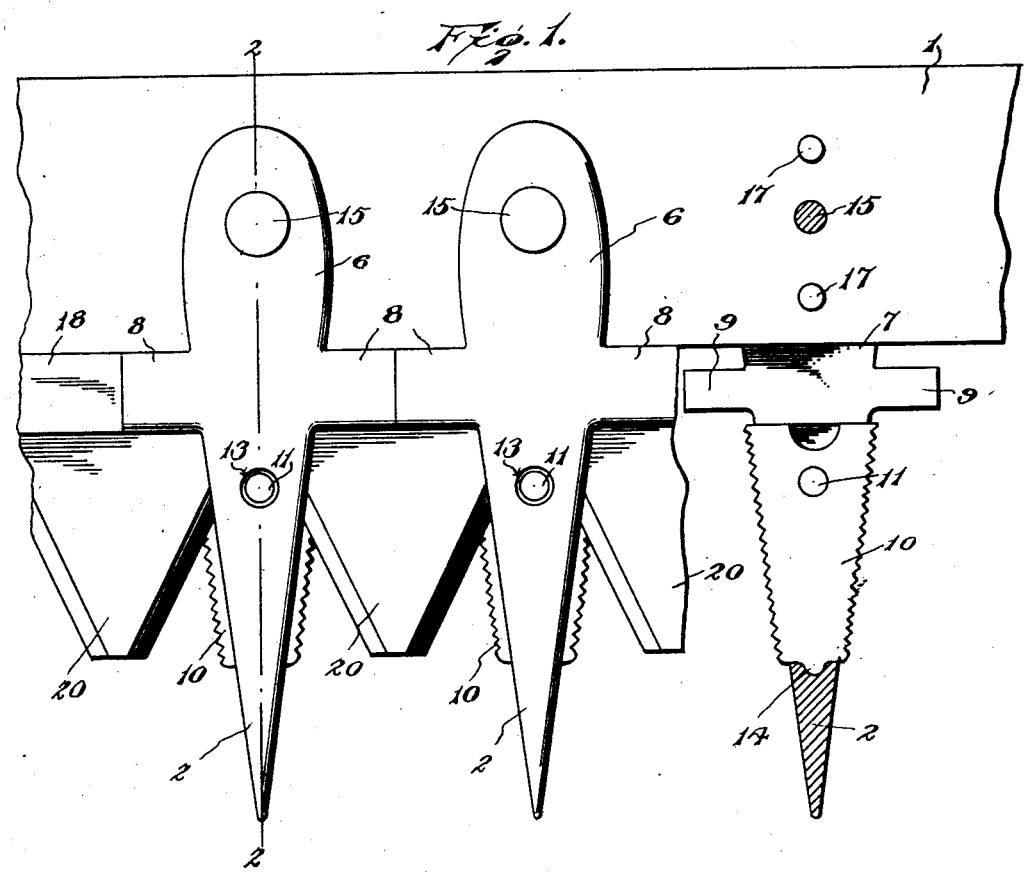
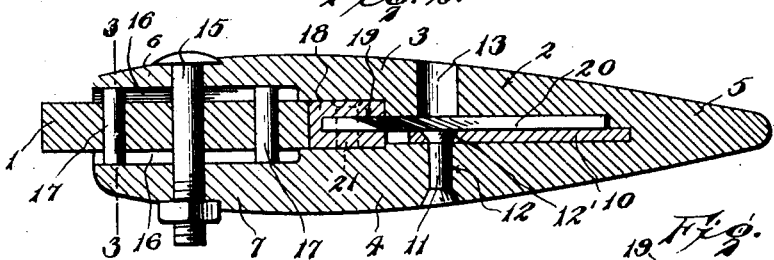
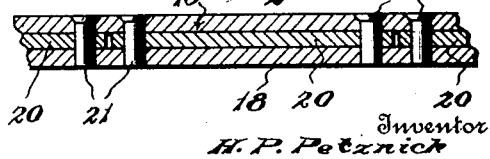
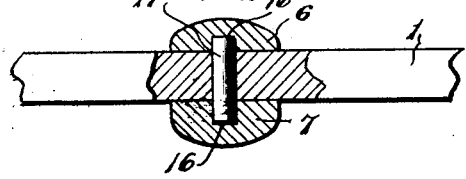
Inventor
H. P. Petznick Patented Oct. 14, 1930

1,778,468

UNITED STATES PATENT OFFICE

HERMAN PAUL PETZNICK, OF DAVENPORT, IOWA, ASSIGNOR OF ONE-HALF TO CHARLES VANE OLDS, OF DAVENPORT, IOWA

SICKLE BAR

Application filed April 4, 1929. Serial No. 352,507.

This invention relates to mowing machines and more particularly to a sickle bar having improved guard fingers.

One object of the invention is to provide a sickle bar with guard fingers which are firmly secured to the sickle bar but may be easily released and removed from the sickle bar if they should become broken or a blade become broken or need sharpening.

Another object of the invention is to allow the blades to be firmly held in place under normal conditions and prevent securing pins for the blades from dropping out of place but allow these pins for the blades to be very easily removed when guard fingers are detached from the sickle bar.

Another object of the invention is to retain the guard fingers at substantially right angles to the sickle bar and prevent them from moving transversely about removable fasteners which secure them to the sickle bar.

Another object of the invention is to provide an improved type of guard finger to which stationary blades may be firmly secured but allowed to be very easily removed if necessary.

The invention is illustrated in the accompanying drawing, wherein

Figure 1 is a top plan view of a portion of a sickle bar having the improved guard fingers applied thereto, Fig. 2 is a transverse sectional view taken on the line 2—2 of Fig. 1, Fig. 3 is a fragmentary sectional view taken on the line 3—3 of Fig. 2, and Fig. 4 is a fragmentary sectional view taken longitudinally through the cutter bar.

The sickle bar or finger bar 1 consists of a metal bar which is preferably rectangular in cross section, as shown in Fig. 2, and to this finger bar are applied guard fingers 2 which project forwardly therefrom. Each of the guard fingers is formed with spaced upper and lower portions 3 and 4 united to form a solid point 5 and the spaced rear ends of the upper and lower portions form attaching arms or heads 6 and 7 from which project side arms 8 and 9. The forward end portion of the slot which divides the finger into upper and lower portions is of reduced depth and in this forward portion of the slot is disposed a ledger plate or stationary knife 10 which rests upon the upper face of the lower portion 4 where it is firmly secured by a rivet or equivalent fastener 11 passed through registering openings 12 and 12' formed in the guard and ledger plate. An opening 13 is formed in the upper portion 3 of the guard finger above the opening 12 so that a rivet may be easily set in place and headed or a rivet removed when it is necessary to remove a ledger plate and replace it. A tooth or lug 14 is provided at the forward end of the ledger plate to prevent the ledger plate from having transverse movement when in place.

When the guard fingers are applied to the sickle bar or finger bar 1, the arms or heads 6 and 7 extend transversely of the sickle bar against its upper and lower faces and bolts 15 are passed through the sickle bar and heads to firmly but releasably secure the guard fingers to the sickle bar. Grooves 16 are formed longitudinally in the inner faces of the heads 6 and 7 and constitute seats which open through the rear ends of these heads and are adapted to receive the upper and lower end portions of pins 17 which pass vertically through the sickle bar, as shown in Figs. 2 and 3, and constitute abutments to engage in the grooves in front of and to the rear of the bolt 15. By this arrangement the guard fingers will be prevented from turning about the securing bolts and moving transversely out of their proper positions at right angles to the sickle bar. Since the grooves 16 open through the rear ends of the heads, the protruding ends of the pins may easily slide into the grooves when the guard fingers are applied to the sickle bar.

When the guard fingers are applied to the sickle bar, the side arms 8 and 9 are disposed in front of the sickle bar, as shown in Fig. 1, and these arms bear against the upper and lower faces of a cutter bar 18 which is slidable longitudinally of the finger bar and passes through the guard fingers, as shown in Fig. 2. Referring to Fig. 2 and Fig. 4, it will be seen that the cutter bar is formed with a longitudinally extending slot 19 which opens through its forward edge face and into this slot are fitted the rear ends of the blades or movable knives 20 which pass through the guard fingers in contacting relation to the ledger plates or stationary knives 10 when the cutter bar is moved. These blades 20 are secured by pins 21 which are adapted to be moved upwardly out of place but since the side arms of the guard fingers extend along the cutter bar and contact with the side arm of adjoining fingers the ends of the pins will be covered and there will be no danger of these pins accidentally moving out of place and releasing the knives.

When the improved sickle bar is in use, the cutter bar is reciprocated longitudinally in the usual manner and the movable knives or blades 20 pass transversely through the guard fingers in the usual manner so that hay or grain will be cut by the action of the stationary and movable blades. If for any reason it is necessary to remove one or more of the blades 20 so that they may be sharpened or repaired or new ones substituted, the guard fingers may be easily released by removing the bolts 15 and the guard plates can be drawn forwardly out of engagement with the finger bar. When the guard fingers are detached from the finger bar, the pins 21 can be withdrawn and the blades will be released. If it is found that a ledger plate needs to be removed, a punch is passed inwardly through the opening 13 to drive the rivet out of place and the ledger plate will be released and permitted to be detached from the guard finger carrying the same. I have, therefore, provided a sickle bar including guard fingers which may be firmly but releasably secured to a finger bar and also provided movable knives which are detachably secured to a cutter bar by removable fasteners retained in place by the guard fingers.

Having thus described the invention, I claim:

1. A finger bar, guard fingers projecting forwardly from said bar and having rear arms extending transversely of the finger bar above and below the same, said arms having longitudinally extending seats formed therein, removable fasteners passed through the arms and finger bar, stops projecting from upper and lower surfaces of the finger bar and received in said seats to prevent transverse movement of the fingers, a cutter bar movable through the fingers longitudinally of the finger bar, and blades carried by said cutter bar.

2. A finger bar, guard fingers projecting forwardly from said bar and having rear arms extending transversely of the finger bar, said arms having their inner faces formed with longitudinally extending seats opening through their rear ends, removable fasteners passed through the arms and finger bar, stops projecting from the finger bar in spaced relation to said stops and engaged in said seats to prevent movement of the fingers about the fasteners, a cutter bar slidable through the fingers in front of said finger bar, and knives carried by said cutter bar and having movement through the fingers when the cutter bar is moved.

3. A finger bar, guard fingers projecting forwardly from said bar and having rear arms extending transversely of the finger bar, said arms having their inner faces formed with longitudinally extending seats opening through their rear ends, removable fasteners passed through the arms and finger bar, pins passed through the finger bar with their ends projecting above and below the finger bar in front of and rearwardly from the fasteners and having their projecting ends engaged in said seats to prevent movement of the fingers about the fasteners, a cutter bar slidable through the fingers in front of said finger bar, and knives carried by said cutter bar and having movement through the fingers when the cutter bar is moved.

4. A finger bar, guard fingers removably secured to said bar and projecting forwardly therefrom, each finger having a longitudinally extending passage defining upper and lower portions integrally united at their forward ends, ledger plates resting upon the upper faces of the lower portions of said fingers, fasteners passed through said ledger plates to secure the ledger plates to the lower portions of the fingers, the upper portions of the fingers having openings formed therein above the fasteners to facilitate insertion and removal of the fasteners, a cutter bar slidable through the fingers longitudinally of the finger bar, and blades carried by said cutter bar, and movable through the passages in the guard fingers across the ledger plates when the cutter bar is slid longitudinally.

5. A finger bar, guard fingers removably secured to said bar and projecting forwardly therefrom, each finger having a longitudinally extending passage having its rear portion of increased depth, a cutter bar slidable through the rear portion of the passage and bearing against the front face of the finger bar, ledger plates in said passages of said fingers in front of said cutter bar, fasteners passed through the ledger plates to secure the same to the lower portions of the fingers, the upper portions of the fingers being integrally united to the lower portions thereof and having openings formed vertically therethrough for access to the fasteners, and blades carried by said cutter bar and movable through the passages across the ledger plates when the cutter bar is moved longitudinally.

6. A finger bar, guard fingers carried by said bar and projecting forwardly therefrom, a cutter bar extending through said fingers transversely thereof, said fingers being removable from the finger bar while the cutter bar is in place, blades carried by said cutter bar and movable therewith through said fingers, and removable fasteners releasably securing said blades to said cutter bar and held in place by the guard fingers.

7. A finger bar, guard fingers carried by said bar and projecting forwardly therefrom, a cutter bar extending through said fingers transversely thereof, said fingers being removable from the finger bar while the cutter bar is in place, blades carried by said cutter bar and movable therewith through said fingers, and securing pins for the blades passed vertically through the cutter bar and rear end portions of the blades, portions of the guard fingers covering the ends of said pins to retain the pins in place.

In testimony whereof I affix my signature.

HERMAN PAUL PETZNICK. [L. S.]